United States Patent
Van Kampen

(10) Patent No.: US 9,350,584 B2
(45) Date of Patent: May 24, 2016

(54) ELEMENT SELECTION UNIT AND A METHOD THEREIN

(71) Applicant: Ericsson Modems SA, Le Grand-Saconnex (CH)

(72) Inventor: David Van Kampen, Eindhoven (NL)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 14/405,214

(22) PCT Filed: Jun. 10, 2013

(86) PCT No.: PCT/EP2013/061882
§ 371 (c)(1),
(2) Date: Dec. 3, 2014

(87) PCT Pub. No.: WO2013/186155
PCT Pub. Date: Dec. 19, 2013

(65) Prior Publication Data
US 2015/0124910 A1    May 7, 2015

Related U.S. Application Data

(60) Provisional application No. 61/661,903, filed on Jun. 20, 2012.

(30) Foreign Application Priority Data

Jun. 14, 2012    (EP) ..................................... 12171963

(51) Int. Cl.
*H04L 27/06*      (2006.01)
*H04L 27/26*      (2006.01)
(Continued)

(52) U.S. Cl.
CPC ........ *H04L 27/2649* (2013.01); *G06F 9/30032* (2013.01); *G06F 9/30036* (2013.01); *G06F 15/8076* (2013.01); *H04L 5/0001* (2013.01)

(58) Field of Classification Search
CPC ............ G03F 15/8076; G03F 9/30032; G03F 9/30036; H04L 27/2649
USPC ......................................................... 375/340
See application file for complete search history.

(56) References Cited

U.S. PATENT DOCUMENTS 5,848,286 A    12/1998    Schiffleger et al.
8,074,010 B2    12/2011    Hutson
(Continued)

FOREIGN PATENT DOCUMENTS

WO    2006/033056 A2    3/2006

OTHER PUBLICATIONS

International Search Report issued in corresponding International application No. PCT/EP2013/061882, date of mailing Oct. 29, 2013.
(Continued)

*Primary Examiner* — Leila Malek
(74) *Attorney, Agent, or Firm* — Patent Portfolio Builders PLLC

(57) ABSTRACT

An element selection unit (200) and a method therein for vector element selection. The element selection unit comprises a selector control circuit (404) and a selector data path circuit (406), which data path circuit comprises a plurality of layers of multiplexers. The element selection unit further comprises a receiving circuit (401) configured to receive an instruction to perform a selection of elements from an input vector. The selector control circuit (404) is configured to generate a multiplexer control signal for each multiplexer based on a bit map and on a plurality of relative offset values. The data path circuit is configured to propagate the elements comprised in the input vector through the plurality of layers of multiplexers towards an output vector based on the generated multiplexer control signals. The data path circuit is further configured to write the propagated elements to enabled elements of the output vector.

17 Claims, 6 Drawing Sheets

(51) Int. Cl.
*G06F 15/80* (2006.01)
*G06F 9/30* (2006.01)
*H04L 5/00* (2006.01)

(56) References Cited

U.S. PATENT DOCUMENTS

2004/0172517 A1* 9/2004 Prokopenko et al. ............ 712/4
2008/0282034 A1* 11/2008 Jiao et al. ...................... 711/125
2009/0172358 A1 7/2009 Sperber et al.
2009/0254736 A1 10/2009 Symes

OTHER PUBLICATIONS

Written Opinion of the International Searching Authority issued in the corresponding International application No. PCT/EP2013/061882, date of mailing Oct. 29, 2013.
Van Berkel, Kees et al., "Vector Processing as an Enabler for Software-Defined Radio in Handheld Devices," EURASIP Journal on Applied Signal Processing vol. 2005, No. 16, pp. 2613-2625, Jan. 1, 2005.
ALTIVECPEM, "AltiVec™ Technology Programming Environments Manual," Rev. 3, Apr. 2006.

* cited by examiner

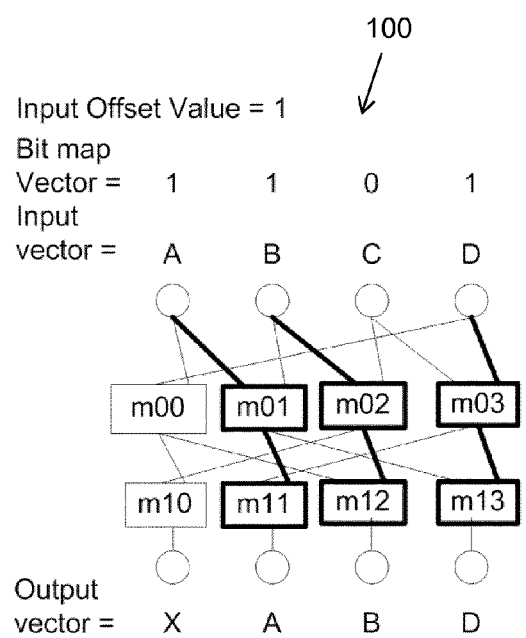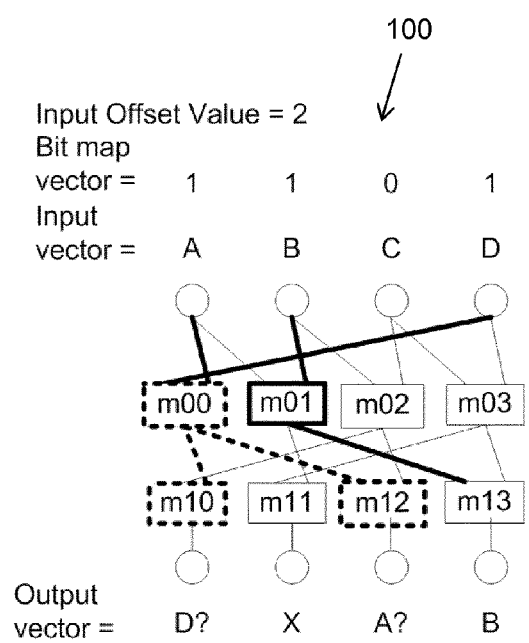
FIG. 1a (prior art)
FIG. 1b (prior art)

```
typedef cntrl_i_t struct {
  bool bit_map;
  unsigned int offset;
} typdef cntrl_o_t struct {
  bool bit_map;
  unsigned int offset;
  bool mxx_sel_left;
} cntrl_o_t cxx(cntrl_i_t inL, cntrl_i_t inR)
{
  cntrl_o_t out;
  out.mxx_sel_left =
(inL.bit_map)&&((inL.offset%1)==1);

if(out.mxx_sel_left) {
    out.offset=inL.offset>>1;
    out.bit_map=1;
  }
  else {
    out.offset=inR.offset>>1;
out.bit_map=(inR.bit_map)&&((inR.offset%1)==
0);
  }
  return out;
}
```

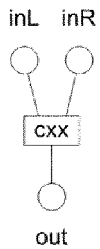

```
typedef cntrl2_i_t struct {
  bool bit_map;
} typdef cntrl2_o_t struct {
  bool bit_map;
  bool mxx_sel_left;
} cntrl2_o_t c'xx(cntrl2_i_t inL, cntrl2_i_t inR)
{
  cntrl2_o_t out;
  out.mxx_sel_left = inL.bit_map;

if(out.mxx_sel_left) {
    out.bit_map=1;
  }
  else {
    out.bit_map=inR.bit_map
  }
  return out;
}
```

FIG. 7a  FIG. 7b

ELEMENT SELECTION UNIT AND A METHOD THEREIN

TECHNICAL FIELD

Embodiments herein relates to an element selection unit for vector element selection, and to a method therein. Further embodiments relate to a load store unit comprising the element selection unit, a memory-to-memory transfer system comprising the element selection unit, a vector processor comprising the element selection unit, and to an integrated circuit comprising the vector processor.

BACKGROUND

For some digital signal processing algorithms, input data has to be aggregated or organized before computation can start. For example, when selecting a scattered set of data elements from a linear input vector, the selected data elements have to be aggregated into a new linear output vector of subsequent data elements before computation can start. Such type of data aggregation or organization is for example required in the equalization processing of data subcarriers in 3GPP Long Term Evolution (LTE) communication systems. LTE is a wireless communication standard using Orthogonal Frequency Division Multiplexing (OFDM). An OFDM based communication system efficiently demodulates (or modulates) a certain number of radio frequency subcarriers through applying a (inverse) Fourier Transform. For LTE there are 12000 or 14000 OFDM symbols per second dependent on the mode. For a 20 MHz bandwidth carrier, each of the 1200 subcarriers per OFDM symbol comprises a modulation symbol. The modulation symbol may for example be a user data symbol or a pilot symbol used for channel estimation. The mapping of various types of information channels and signals on these subcarriers can be quite complex and scattered. Before doing equalization processing of the data channel, the data symbols in some receiver systems is extracted from the input OFDM symbol, and concatenated into a new vector. An example receiver system comprises a vector processor on which the equalization processing is mapped.

Dynamic Memory Allocation (DMA) is often used to copy data elements in an embedded system. Typically, a DMA unit transports rather coarse grained blocks of data elements. By the expression "rather coarse grained blocks of data" is meant blocks of data having a size in the range from tens to millions of bytes. The smaller the data blocks are, i.e. the shorter the data bursts are, the larger will the overhead of controlling and configuring the data transport be. DMA units often have support for a scatter gather operation, i.e. support for a linked list of DMA configurations that are executed in sequence. Selection of resource elements in LTE, i.e. selection of complex words of e.g. 32 bits, would be too fine grained for a DMA unit.

Classical Digital Signal Processors (DSPs) operate on scalar sample granularity. Therefore, they may be very selective in loading from and in storing to a memory. Further, selection of data elements may be done, while performing computational processing. Thus, there is no need to perform the copying of data elements into a temporary data vector. However, it should be noted that the selectivity of the classical DSPs, i.e. the scalar sample granularity, may add complex control structures in the signal processing software.

Further, a device loading and storing one selected scalar element at a time requires quite some time to aggregate all selected data elements.

As an example, assume that an LTE category 5 receiver is available. The LTE category 5 receiver is a receiver supporting a downlink data rate of 300 Mbit/s in a 20 MHz frequency band, and with a 4×4 Multiple Input Multiple Output (MIMO) receiver configuration (and therefore has 4 receive antennas). Further, assume that the data element extraction is mapped onto a scalar DSP with one data memory interface. Such a DSP would then be loaded for up to 134 Million of Instructions Per Second (MIPS) for this task. The processor load is calculated as 4 receive antennas*1200 data symbols/OFDM symbol/antenna*14000 OFDM symbols/s*2 pipelined processor cycles/data element selection for the load and store operations.

In addition, to select data elements of 4 receiver antenna streams, selection of data elements from 16 channel estimate streams has also to be performed. The selection pattern has the same selection grid as the data element selection of the received symbol streams and would result in a processor load of up to 670 MIPS, which is a significant overhead and has quite some latency. The processor load is calculated as 16 channel estimate streams*1200 estimates/OFDM symbol/channel estimate stream*14000 OFDM symbols/s*2 pipelined processor cycles/data element selection for the load and store operations.

Vector DSPs perform operations on vectors of data elements. An important class of operation is the so called Single Instruction Multiple Data (SIMD) operation, which operation performs the same arithmetic operation on a plurality of input vectors by means of an array of identical parallel processing units. The SIMD operation requires that the algorithm is vectorizable, meaning that input data elements should be able to be processed as vectors of adjacent data elements. By the available hardware parallelism, i.e. the parallel processing units, the vector DSP is capable of performing the SIMD operations which provide a higher computational throughput as compared to the computational throughput provided by the classical, non-vector, DSPs.

Typically, the vector DSP has a vector memory. Thus, the vector DSP may access a vector of subsequent data elements in one instruction. Further, the vector DSP often has a vector register file to store intermediate results in, whereby communication to the vector memory may be reduced. Furthermore, the vector DSP requires the high memory bandwidth that the vector memory can provide, so that the load and/or store throughput can keep up with the computational throughput.

Vector DSPs may have some support for data element reorganization within the vector. For example a shuffle unit can be available, which shuffle unit may be useful for selecting per output data element a specific input data element. The shuffle operation function can be based on a configuration pattern with absolute indices or relative distances.

A vector processor or similar device capable of loading and/or storing vectors of P data elements from a vector memory has a higher memory bandwidth than a device with a scalar load interface and/or a scalar store interface. For data element selection at the same throughput as the memory system, the vector processor must be capable to perform shuffling of input data elements and to aggregate the selected data elements into one or more output vectors. A vector processor with a shuffle unit, a vector register file, and with support for mask based element selection can perform this task. However, as the selection patterns can be dynamic, for example as in the LTE element extraction case, these shuffle and mask patterns have to be dynamically selected or calculated.

On-the-fly shuffle pattern and mask pattern calculation give computational overhead on top of the signal processing.

Operations on Boolean data types and shuffle pattern data types have to be supported by the processor.

Not all processors support calculation of patterns. In some vector processors shuffle patterns have to be defined at compile time. Having all possible patterns hard coded is not possible. Patterns can be pre-stored and looked-up. Note that the number of total possible patterns in the general case is a function of the number of data elements in the vector. The number of total possible patterns can be calculated as $P*2^P$, i.e. as the number of rotation offset positions (equal to P) times the number of possible mask vectors (equal to $2^P$), wherein P is the number of data elements in the vector. The number of patterns and therefore the required storage memory explodes with increasing vector size. The pattern table therefore has to be use-case dependent to make it more cost-efficient. This makes the pattern table and the lookup process more complex.

Calculating or loading of shuffle and mask patterns from tables gives a run time overhead, which may to some extend be shared among multiple streams. This overhead cannot be software pipelined with computational operations, for example of the equalization task.

WO 2006/033056 describes a microprocessor device and a method for shuffle operations. The microprocessor device comprises a vector processor architecture with a functional vector processor unit comprising first memory means for storing plural index vectors and processing means. The functional vector processor unit is arranged to receive a processing instruction and at least one input vector to be processed. The first memory means is arranged to provide the processing means with one of said plural index vectors in accordance with the processing instruction, and the processing means being arranged to generate in response to said instruction at least one output vector having the elements of the at least one input vector rearranged in accordance with the one index vector provided. The functional vector processor unit further comprises pre-processing means arranged to receive a parameter and to process the elements of the one index vector dependent on said parameter before generating said at least one output vector in accordance with the processed index vector.

Adding a shuffle circuit to a vector processor in order to support data element selection is costly in terms of the area and power required. Further, shuffle circuits are expensive circuits, since the number of two-input multiplexers comprised in the shuffle circuit scales quadratically with the number P of data elements as (P−1)*P. Note that the area of a full shuffle circuit however is dominated by wiring and not so much by standard cells in current Complementary Metal-Oxide-Semiconductor (CMOS) technologies.

SUMMARY

It is an object of embodiments herein to provide a way of improving performance in a data processing system.

According to a first aspect of embodiments herein, the object is achieved by a method in an element selection unit for vector element selection. The element selection unit comprises a selector control circuit and a selector data path circuit, which selector data path circuit comprises a plurality of layers that each comprises a plurality of multiplexers.

The element selection unit receives an instruction to perform a selection of data elements from a source vector comprising at least one input vector. The instruction comprises information relating to the at least one input vector, information relating to the at least one output vector, and information relating to a bit map.

The selector control circuit generates a multiplexer control signal for each multiplexer of the plurality of multiplexers based on the bit map and on a plurality of relative offset values. Each of which plurality of relative offset values is calculated for each of the data elements of the input vector based on an input offset value and based on the bit map.

The selector data path circuit propagates the data elements comprised in the input vector through the plurality of layers of multiplexers towards the output vector based on the generated multiplexer control signals. Further, the selector data path circuit writes the propagated data elements to enabled data elements of the output vector.

According to a second aspect of embodiments herein, the object is achieved by an element selection unit for vector element selection. The element selection unit comprises a selector control circuit and a selector data path circuit. The selector data path circuit comprises a plurality of layers that each comprises a plurality of multiplexers.

The element selection unit further comprises a receiving circuit configured to receive an instruction to perform a selection of data elements from a source vector comprising at least one input vector. The instruction comprises information relating to the at least one input vector, information relating the at least one output vector, and information relating to a bit map.

The selector control circuit is configured to generate a multiplexer control signal for each multiplexer of the plurality of multiplexers based on the bit map and on a plurality of relative offset values. Each of which plurality of relative offset values is calculated for each of the data elements of the input vector based on an input offset value and based on the bit map.

The selector data path circuit is configured to propagate the data elements comprised in the input vector through the plurality of layers of multiplexers towards the output vector based on the generated multiplexer control signals. Further, the selector data path circuit is configured to write the propagated data elements to enabled data elements of the output vector.

Since a multiplexer control signal is generated for each multiplexer of the plurality of multiplexers based on the bit map and on a plurality of relative offset values and since P data elements comprised in the input vector propagate in parallel through the plurality of layers of multiplexers towards the output vector based on the generated multiplexer control signals, vector element selection is accomplished at a high throughput. This results in an improved performance of the data processing system.

An advantage with embodiments herein is that the area required for the implementation of the element selection unit and the power consumed by the element selection is reduced as compared to shuffle based systems.

A further advantage with embodiments herein is that they support streaming mode since input vectors are only loaded once and only used once for an element selection operation.

A further advantage with embodiments herein is that they have a low configuration overhead since the element selection unit only requires the preparation of a Boolean bit map vector which is performed efficiently through bitwise operations.

A further advantage with embodiments herein is that they have a low cost for storing the Boolean bit map vector. The cost is one bit per input word which is less than the cost in shuffle based systems.

According to a third aspect of embodiments herein, the object is achieved by a load store unit comprising the element selection unit.

According to a fourth aspect of embodiments herein, the object is achieved by a memory-to-memory transfer system comprising the load store unit.

According to a fifth aspect of embodiments herein, the object is achieved by a vector processor comprising the element selection unit.

According to a sixth aspect of embodiments herein, the object is achieved by an integrated circuit comprising the vector processor.

According to a seventh aspect of embodiments herein, the object is achieved by a communication device comprising the integrated circuit.

BRIEF DESCRIPTION OF THE DRAWINGS

Examples of embodiments herein are described in more detail with reference to attached drawings in which:

FIGS. 1a, 1b schematically illustrate prior art basic vector rotator circuits with non-overlapping path and overlapping paths, respectively;

FIGS. 7a, 7b are exemplifying descriptions of the functionality of the control blocks of the selector control circuit written in the computer programming language C.

DETAILED DESCRIPTION

Embodiments will be exemplified in the following non-limiting description.

Embodiments herein relate to a high-throughput low-cost element selection unit. The element selection unit is capable of selecting data elements from an input vector, concatenating the selected data elements, giving the selected set of data elements a common rotation and merging the selected set of data elements with an output vector.

The selection of data elements from the input vector is based on a selection bit map, i.e. a vector of Boolean values.

Each data element corresponds to a word, i.e. a fixed size of W' bits, which is handled as a unit. The word size may for example be equal to 8, 16, or 32 bits.

Figure 6:
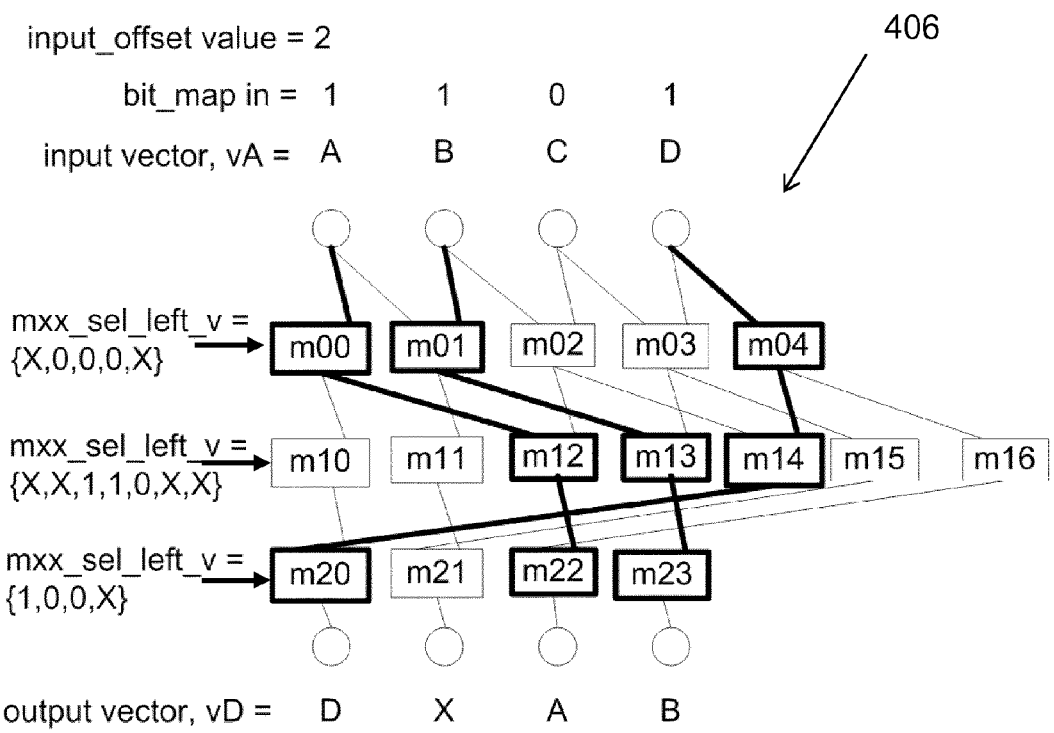
FIG. 6 is a schematic block diagram illustrating embodiments of a selector data path circuit.

The element selection unit comprises ($^2$ log(P)+1) layers with P−1 two-input multiplexers of W bits width, which multiplexers are individually controlled, cf. FIG. 6 which will be described in more detail below. P is the number of data elements in the input vector, and may be equal to 4, 8, 16, or 32 data elements. W is the width of the multiplexer and may be equal to 8, 16, or 32 bits. The multiplexer control is dependent on the selection bit map and on a rotation offset. Note that the circuit illustrated in FIG. 6 is a conceptual picture, where a real productized circuit may be optimized by for example using three-input multiplexers, four-input multiplexer etc. Further, a selection control unit and a selector data path circuit, which will be described below, may be merged into a single unit.

Embodiments herein are based on the observation of paths from input elements to output elements in a prior art basic vector rotator circuit 100. The prior art basic vector rotator circuit 100 is schematically illustrated in FIGS. 1a and 1b, and comprises a first layer of multiplexers m00, ..., m03, and a second layer of multiplexer m10, ..., m13.

In FIG. 1a, the input offset value is equal to one (1), the bit map vector is (1, 1, 0, 1) and the input vector is (A, B, C, D). For a normal rotation, e.g. defined by an input offset value equal to one (1), all input data elements of an input vector comprising P data elements will get the same relative rotation. In other words, all data elements will get the same offset between the index of the input data elements and the index of the output data elements. Thus, all P paths through the vector rotator circuit 100 will go nicely in parallel and do not pass over the same multiplexer m00, ..., m13.

If an input data element is not selected by the vector rotator circuit 100, as defined by a bit map value equal to zero (0), the following input data elements should receive a rotation offset that is one position less than the rotation offset that the to be discarded data element would have. As illustrated in FIG. 1a, the third data element of the input vector, i.e. the data element with index 2 and value "C", should not be selected since the corresponding bit map value is equal to zero (0). Since the data element with index 2 and value "C" if it was selected should have had a rotation offset equal to one (1), the following data element, i.e. the data element with index 3 and value "D", should have a rotation offset that is one position less than one (1), i.e. the data element with index 3 and value "D" should have a rotation offset equal to zero (0), cf. FIG. 1a. Thus, the paths of all selected data elements towards the output will always stay to the right-hand side of the paths of the selected data elements before it, and the resulting output vector will be (X, A, B, D), wherein X may be a previously stored data value or an empty data element.

Because of a need to provide a common rotation offset to a concatenated set of selected data elements before storing them into an output vector, the paths of the selected data elements can wrap around in the prior art basic vector rotator circuit 100. Note that the common rotation offset can be in range of 0, ..., P−1, where P is the number of data elements in the input vector.

Trying to provide a common rotation offset to a concatenated set of selected data elements before storing them into an output vector on the prior art basic vector rotator circuit 100 will lead to conflicting paths for some selection patterns as is illustrated in FIG. 1b.

The prior art basic vector rotator circuit 100 of FIG. 1b comprises a first layer of multiplexers, m00, ..., m03, and a second layer of multiplexer, m10, ..., m13. In FIG. 1b, the input offset value is equal to two (2), the bit map vector is (1, 1, 0, 1) and the input vector is (A, B, C, D). As illustrated in FIG. 1 b, conflicting paths will occur for the data elements with index 0 and 3, respectively, i.e. the data elements with the values "A" and "D", respectively. The data elements with the values "A" and "D" cannot both be selected by multiplexer m00 and therefore cannot both be propagated to the respective desired positions in the output vector.

Therefore, embodiments herein relate to an element selection unit 200, cf. FIGS. 2a-2d, wherein, for all possible selection patterns and possible rotations offsets, there are no conflicting paths.

Further, in FIGS. 2a-2d, embodiments relating to a load store unit 202 comprising the element selection unit 200, to a memory-to-memory transfer system 204 comprising the element selection unit 200, to a vector processor 206 comprising the element selection unit 200, to an integrated circuit 208 comprising the vector processor 206, and to a communication device 210 comprising the integrated circuit 208 are also schematically illustrated.

Figure 3:
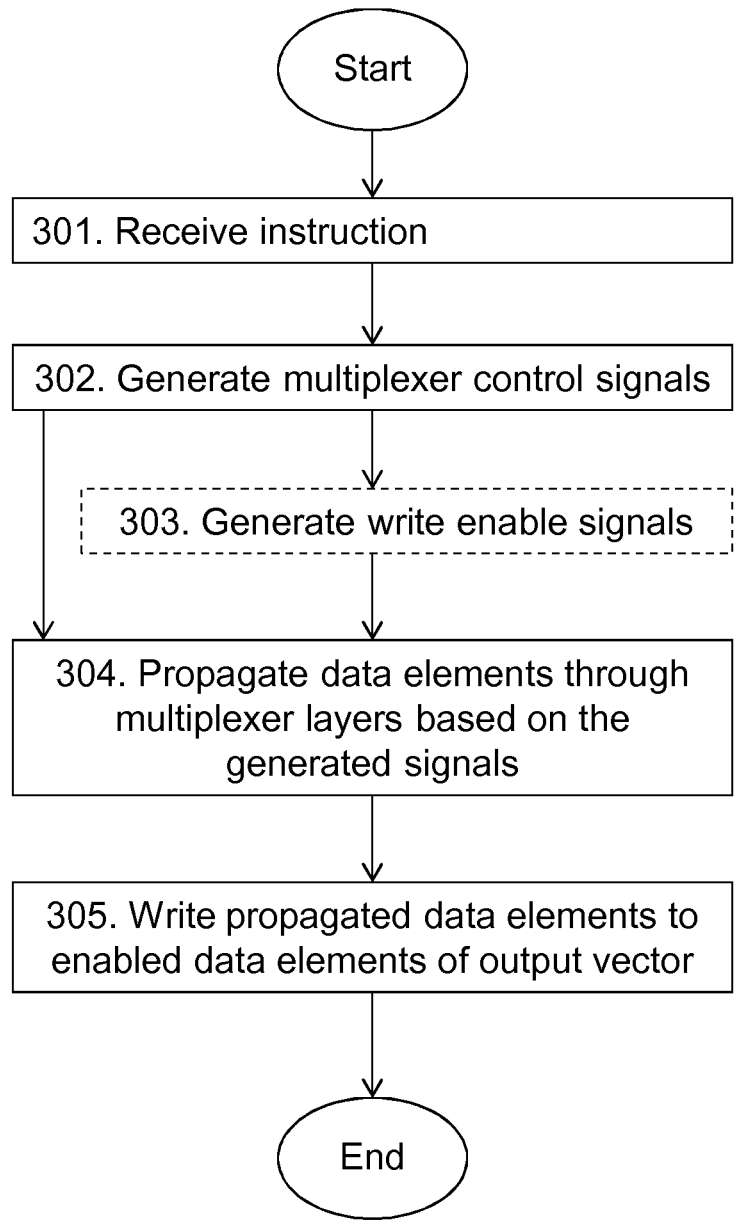
FIG. 3 a flowchart depicting embodiments of a method in an element selection unit.

Actions in some embodiments of the element selection unit 200 for vector element selection will now be described with reference to FIG. 3. The actions do not have to be performed in the order stated below, but may be taken in any suitable order. Further, actions may be combined.

Action 301

The element selection unit 200 receives an instruction to perform a selection of data elements from a source vector comprising at least one input vector vA with P elements given by index i=[0, . . . , P−1]. The element selection unit 200 may further be configured to decode the instruction. The instruction comprises information relating to the at least one input vector vA, information relating at least one output vector vD, and information relating to a bit map bit_map.

Action 302

In order to control the operation of a plurality of multiplexers comprised in the element selection unit 200, the element selection unit 200 generates a multiplexer control signal mxx_ sel_left for each multiplexer of the plurality of multiplexers. The multiplexer control signal mxx_sel_left may be generated based on the bit map bit_map and on a plurality of relative offset values. Each of the plurality of relative offset values is calculated for each of the data elements of the input vector vA based on an input offset value and based on the bit map bit_map. The input offset value is herein sometimes referred to as an input offset.

In some embodiments, each relative offset value rel_offset (i) is calculated as:

$$\text{rel\_offset}(i) = \Sigma_{j=0}^{i-1} \text{bit\_map}(j) + (\text{input\_offset} - i),$$

wherein i is the number of data elements in the input vector vA, wherein bit_map(j) is the bit map value for element j of the bit map bit_map, and wherein input_offset is the input offset value.

Action 303

The element selection unit 200 may also generate write enabling signals for data elements of the output vector vD based on the bit map bit_map. Each write enabling signal enables writing to one of the data elements of the output vector vD, as will be described in more detail in Action 305 below. Thus, when the selected data elements of the input vector vA have been propagated through a plurality of layers of multiplexers towards the output vector vD as will be described in Action 304 below, only the selected data elements of the input vector vA will update their respective data elements of the output vector vD. Thus, the remaining data elements of the output vector vD will not be overwritten and may therefore comprise one or more previously stored data elements.

Action 304

The element selection unit 200 propagates the data elements comprised in the input vector vA through the plurality of layers of multiplexers towards the output vector vD based on the generated multiplexer control signals mxx_sel_left.

In order to be able to propagate the data elements comprised in the input vector vA, the element selection unit 200 may read the input vector vA from for example a vector memory based on the information relating to the at least one input vector vA that was comprised in the instruction received in Action 301.

In some embodiments, the propagating of the data elements further comprises that the element selection unit 200 configures data paths through the plurality of layers of multiplexers based on the generated multiplexer control signals mxx_sel_left. The configured data paths may then be used when propagating the data elements through the multiplexer layers.

Action 305

The element selection unit 200 writes the propagated data elements to enabled data elements of the output vector vD.

Figure 4:
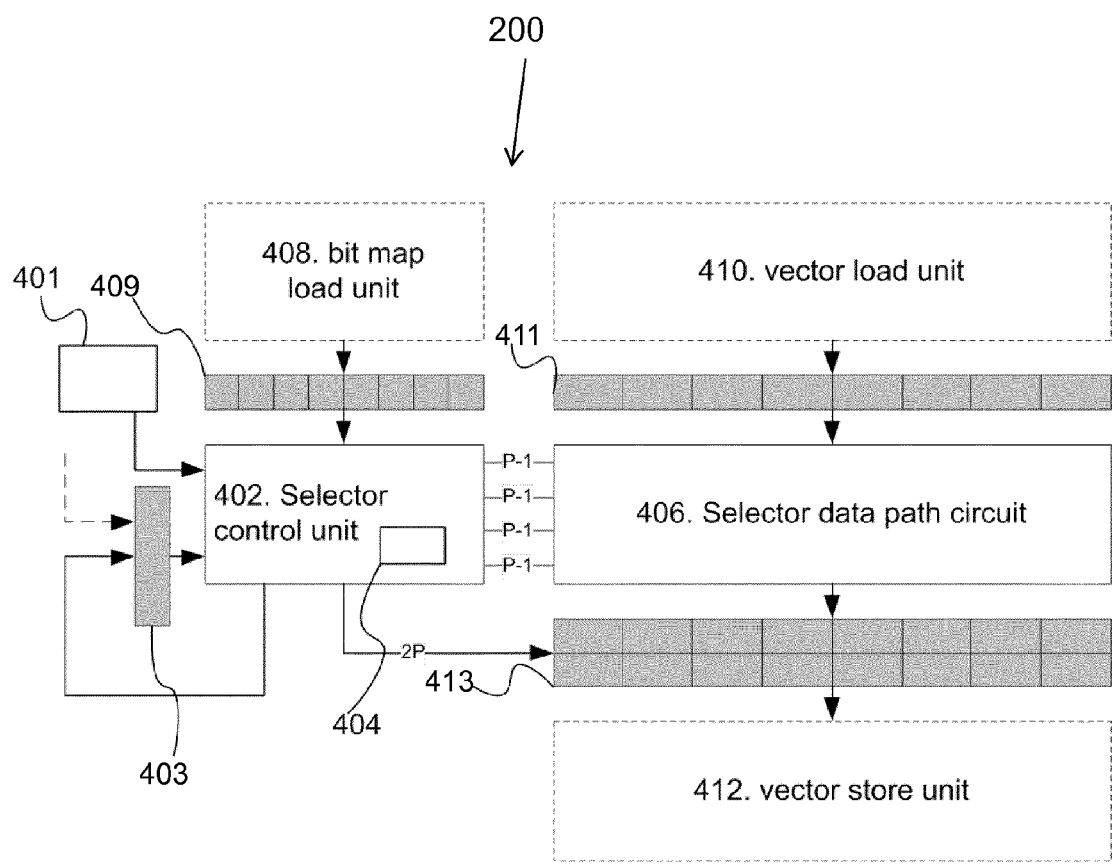
FIG. 4 is a schematic block diagram illustrating embodiments of an element selection unit.

To perform the method actions in the element selection unit 200 described above for vector selection, the element selection unit 200 comprises the following arrangement depicted in FIG. 4.

The element selection unit 200 comprises a receiving circuit 401 configured to receive information and instructions. For example, the receiving circuit 401 may be configured to receive an instruction to perform a selection of data elements from a source vector, or information relating to such a selection instruction. Further, the receiving circuit 401 may be configured to receive the information and the instructions from an Instruction Fetch Unit (IFU) (not shown), of a processor. Furthermore, the receiving circuit 401 may be configured to decode information and instructions. Thus, the receiving circuit 401 may be referred to as an instruction decoder circuit.

The source vector comprises at least one input vector vA.

The selection instruction comprises information relating to the at least one input vector vA, information relating the at least one output vector vD, and information relating to a bit map bit_map.

The element selection unit 200 may further comprise a selector control unit 402.

In some embodiments, the selector control unit 402 receives a selection mask as an input vector of Booleans. The selection mask is herein also referred to as a bit map vector or only a bit map, bit_map. The bit map, bit_map, comprises bit map elements indexed by i=[0 . . . P−1]. In some embodiments, the selector control unit 402 receives the bit map bit_map from a bit map register 409 comprised in or connected to the element selection unit 200.

The selector control unit 402 may further receive an input rotation offset value, named input_offset, comprising a value in the range of [0, . . . , P−1]. The selector control unit 402 may receive the input rotation offset value from an input offset register 403.

In some embodiments, the selector control unit 402 calculates per data element of the input vector, with index i, the relative offset, rel_offset(i), between a destination index in the output vector vD, and a source index in the input vector vA:

$$\text{rel\_offset}(i) = \Sigma_{j=0}^{i-1} \text{bit\_map}(j) + (\text{input\_offset} - i),$$

wherein i is the number of data elements in the input vector vA, wherein bit_map(j) is the bit map value for element j of the bit map bit_map, and wherein input_offset is the input offset value.

Based on the calculated relative offset per data element and the selection mask, i.e. the bit map bit_map, the selector control unit 402 may calculate multiplexer settings. Thus, paths from input elements of the input vector vA to the desired positions in the output vector vD are set up.

In some embodiments, the multiplexer settings may be defined by means of the multiplexer control signals mxx_ sel_left described in Action 302 and generated by a selector control circuit 404, which will be described in more detail below. The selector control circuit 404 may be comprised in the selector control unit 402 or it may be connected to the selector control unit 402.

Further, the selector control unit 402 may use an output bit map bit_map out to calculate write enable signals of all P data elements of the output vector, vD. Thus, only selected data elements of the input vector vA will update data elements of the output vector vD and therefore data elements of a previous selection that have to be appended to, will not be overwritten.

The output bit_map bit_map out may be calculated by a selector control circuit 404 which will be described in more detail below. As will be described below, the output bitmap bit_map out will comprise Booleans from the input bitmap bit_map_in that have received the same selection, rotation and concatenation as their corresponding selected data elements.

In some embodiments, the selector control unit 402 calculates an output offset value, output_offset, for the next iteration, i.e. for the next selection of data elements from a next input vector. The output offset value output_offset value for the next iteration may be calculated based on the input offset value input_offset of the current iteration, plus the number of words that are appended in the current iteration. The output offset value, output_offset, may be calculated as:

$$\text{output\_offset} = \left( \sum_{i=0}^{P-1} \text{bit\_map}(i) + \text{input\_offset} \right) \% P$$

wherein P is the number of data elements in the input vector vA, wherein bit_map is the selection mask; wherein input_offset is the input offset of the current iteration, and wherein % is the modulus operation.

It should be understood that for the next iteration, the calculated output offset value will be used as the input offset value.

A selector control circuit 404 is further comprised in the element selection unit 200. As previously mentioned, in some embodiments, the selector control circuit 404 is comprised in the selector control unit 402. However, the selector control unit 402 and the selector control circuit 404 may be combined into one single unit.

The selector control circuit 404 is configured to calculate multiplexer settings, i.e. to generate a multiplexer control signal mxx_sel_left for each multiplexer of a plurality of multiplexers m00, m01, ..., m23 comprised in the element selection unit 200. The multiplexer control signal mxx_sel_left is generated based on the bit map bit_map and on a plurality of relative offset values. Each of which plurality of relative offset values is calculated for each of the data elements of the input vector vA based on an input offset value and based on the bit map bit_map.

As previously mentioned, the relative offset values may be calculated by the selector control unit 402. Further, the selector control circuit 404 may receive the relative offset values from the selector control unit 402.

The selector control circuit 404 may further be configured to generate write enabling signals for data elements of the output vector vD based on the bit map bit_map and input offset value.

Figure 5:
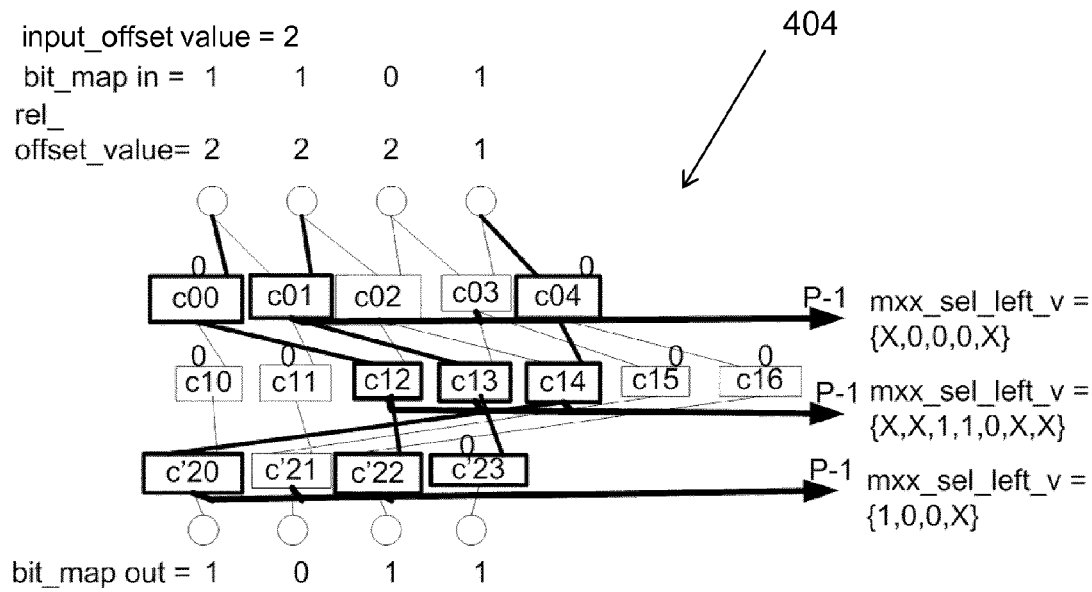
FIG. 5 is a schematic block diagram illustrating embodiments of a selector control circuit.

In some embodiments, the write enabling signal is generated based on an output bit map vector, which is denoted bit_map out in FIG. 5. FIG. 5 will be described below. The output bit map vector is calculated based in the input bit map, which is denoted bit_map in in FIG. 5. The output bitmap bit_map out will receive the same rotation and concatenation as the corresponding selected data elements.

Each generated write enabling signal enables writing to one of the data elements of the output vector vD.

In some embodiments, the selector control circuit 404 has basically the same structure as a selector data path circuit 406, some embodiments of which will be described below with reference to FIG. 6. As schematically illustrated in FIG. 5, some embodiments of the selector control circuit 404 may comprise a number of functional blocks c00, ..., c04, c10, ..., c16, c'20, ..., c'23. Further, as schematically illustrated in FIG. 6, some embodiments of the selector data path circuit 406 may comprise a number of multiplexers m00, m01, ..., m23. It should be understood that the functional blocks c00, ..., c04, c10, ..., c16, c'20, ..., c'23 of FIG. 5 do not represent two-input multiplexers as in FIG. 6, but the blocks illustrate functional block performing a function cxx or a function c'xx as will be described in more detail below. The input lines to the respective cxx or c'xx functional blocks in FIG. 5 correspond to a compound data type. As further illustrated in FIG. 5, the output of the selector control circuit 404 comprises P−1 control signals per cxx/c'xx functional layer, i.e. P−1 control signals per multiplexer layer of the selector data path circuit 406 of FIG. 6. In other words, the selector control circuit 404 generates one control signal for each multiplexer m00, m01, ..., m23 comprised in the selector data path circuit 406.

Thus, each cxx/c'xx block calculates the selection control signal of its corresponding multiplexer. Therefore, the functional blocks cxx/c'xx are herein sometimes also referred to as multiplexer control blocks.

Further, each cxx/c'xx block performs the calculation based on two input control signals. The input control signals may be compound control signals. By compound control signals is meant a signal with a complex data type that comprises multiple basic signal types in one combined structure.

The left input control signal to a cxx/c'xx block comprises the bit map value of the left input data element and the remaining relative offset that the left input data element still has to stride through the selector data path circuit 406 and the right input control signal to a cxx/c'xx block comprises the bit map value of the right input data element and the remaining relative offset that the right input data element still has to stride through the selector data path circuit 406. If the left input data element's bit map value is 1, i.e. the left input data element is selected and if the left input data element has an odd relative offset, i.e. its last offset bit is 1, then the left input data element needs to make a stride to the multiplexer columns and has to be propagated. Therefore the left input data element should be selected by the functional block. If these two conditions are not met the right input data element is selected by the functional block. This will be exemplified in more detail below with reference to an exemplifying element selection unit 200 and to FIGS. 5 and 6.

In case the right input data element is selected by the functional block, cf. the else-clause of FIG. 7a, the output bit map bit_map out is calculated based on the relative offset value of the right input data element and on its bit map value. For example, only if the relative offset of this right input is even, and the input bit map value is still one at this point, the data element should be marked as selected for further propagation, i.e. the output bitmap should be set to 1. This will be exemplified in more detail below with reference to an exemplifying element selection unit 200 and to FIGS. 5 and 6.

A C-style exemplifying description of the functionality of the respective functional blocks, cxx and c'xx, are given in FIGS. 7a and 7b, respectively. Note that the behaviour for the last layer functional blocks, i.e. the c'xx blocks, is slightly different from the behaviour of the other layers functional blocks, i.e. the cxx blocks, in that in the c'xx blocks there is just selection, no further striding in the last layer.

The element selection unit 200 comprises further a selector data path circuit 406. The selector data path circuit 406 comprises a plurality of layers that each comprises a plurality of multiplexers m00, m01, . . . , m23.

In some embodiments, the data path of the selector data path circuit 406 is configured as $^2\log(P)+1$ two-input multiplexer layers, cf. FIG. 6, with index I=[0, . . . , $^2\log(P)$]. The layers have P−1 two-input multiplexers of width W bits for selecting one or more data elements of the input vector and propagating the one or more selected data elements to the output vector. In FIG. 6, the first multiplexer layer of the selector data path circuit 406 comprises the multiplexers m01, m02, and m03, the second multiplexer layer comprises the multiplexers m12, m13, and m14, and the third multiplexer layer comprises the multiplexers m21, m22, and m23.

Further, conceptually, the selector data path circuit 406 may have for the first 2 log(P) multiplexer layers, $2^{I+1}$ nodes per multiplexer layer, which $2^{I+1}$ nodes fork the signal in two directions. In FIG. 6, the first multiplexer layer of the selector data path circuit 406 comprises two (2) nodes that fork the signal. These two nodes are denoted m00 and m04, respectively. These two nodes m00 and m04 correspond to the blocks c00 and c04 of FIG. 5. Further, the second multiplexer layer comprises four (4) nodes that fork the signal, which nodes are denoted m10, m11, m15 and m16, respectively. These four nodes correspond to the blocks c10, c11, c15, and c16 in FIG. 5. Furthermore, the third multiplexer layer, i.e. the last multiplexer layer, comprises only one (1) node that fork the signal, which node is denoted m23. This node m23 corresponds to the block c'23 of FIG. 5.

The selector data path circuit 406 receives or reads the input vector vA, with P elements indexed by i=[0 . . . P−1] and outputs an output vector vD with P elements indexed by i=[0 . . . P−1]. In order for the selector path circuit 406 to be efficient, the input vector and the output vector should be of the same size. However, if the output vector is smaller than the input vector, multiple passes of propagating the same input to the output may be needed. Further, if the output vector is larger in width, say 2P, then the selector path circuit 406 would not be so efficient.

The selector data path circuit 406 is configured to propagate the data elements comprised in the input vector vA through the plurality of layers of multiplexers m00, m01, . . . , m23 towards the output vector vD based on the generated multiplexer control signals mxx_sel_left. As previously mentioned, the selector control circuit 404 generates the multiplexer control signals mxx_sel_left, and thus the selector data path circuit 406 may receive the generated multiplexer control signals mxx_sel_left from the selector control circuit 404 as schematically illustrated in FIGS. 5 and 6.

Further, the selector data path circuit 406 is configured to write the propagated data elements to enabled data elements of the output vector vD.

In some embodiments, the selector data path circuit 406 further is configured to configure data paths through the plurality of layers of multiplexers m00, m01, . . . , m23 based on the generated multiplexer control signals mxx_sel_left.

The element selection unit 200 may further comprise a bit map load unit 408. However, in some embodiments, the bit map load unit 408 is connected to the element selection unit 200. The bit map load unit 408 may be configured to load a bit map bit_map into a bit map register 409.

In some embodiments, the element selection unit 200 comprises a vector load unit 410. However, in other embodiments, the vector load unit 410 may be connected to the element selection unit 200. The vector load unit 410 may be configured to load an input vector vA into an input vector register 411.

The element selection unit 200 may further comprise a vector store unit 412. However, in some embodiments, the vector store unit 412 is connected to the element selection unit 200. The vector store unit 412 may be configured to store a vector comprised in an output vector register 413.

It should be understood that components of the element selection unit 200 may be merged into one or more combined units. For example, the selector control unit 402 and the selector data path circuit 406 may be combined into a single unit. Further, in some embodiments, the selector control unit 402 comprises the selector data path circuit 406.

Exemplifying Element Selection Unit 200

The control and data flow for an exemplifying element selection unit 200 will now be described with reference to FIGS. 4, 5, 6, and 7. In the example, the input vector vA comprises four input data elements indexed by i={0, . . . , 3} and comprising the data values "A", "B", "C", and "D", respectively.

A bit map bit_map (also referred to as bit_map in in FIGS. 5 and 6) is provided as input to the selector control unit 402. The bit map comprises the Boolean values {1,1,0,1}. Further, an input offset value input offset value with value 2 is provided. Based on the input bit map and the input offset value of the first selected data element, the relative offset values rel_offset values for all input data elements are calculated. The relative offset values are calculated as:

$$\begin{bmatrix} rel\_offset(0) \\ rel\_offset(1) \\ rel\_offset(2) \\ rel\_offset(3) \end{bmatrix} = \begin{bmatrix} 0 & 0 & 0 & 0 \\ 1 & 0 & 0 & 0 \\ 1 & 1 & 0 & 0 \\ 1 & 1 & 1 & 0 \end{bmatrix} \begin{bmatrix} bit\_map(0) \\ bit\_map(1) \\ bit\_map(2) \\ bit\_map(3) \end{bmatrix} +$$

$$\begin{bmatrix} input\_offset \\ input\_offset \\ input\_offset \\ input\_offset \end{bmatrix} - \begin{bmatrix} 0 \\ 1 \\ 2 \\ 3 \end{bmatrix}$$

$$= \begin{bmatrix} 0 & 0 & 0 & 0 \\ 1 & 0 & 0 & 0 \\ 1 & 1 & 0 & 0 \\ 1 & 1 & 1 & 0 \end{bmatrix} \begin{bmatrix} 1 \\ 1 \\ 0 \\ 1 \end{bmatrix} + \begin{bmatrix} 2 \\ 2 \\ 2 \\ 2 \end{bmatrix} - \begin{bmatrix} 0 \\ 1 \\ 2 \\ 3 \end{bmatrix}$$

$$= \begin{bmatrix} 2 \\ 2 \\ 2 \\ 1 \end{bmatrix}$$

The relative offset vector {2,2,2,1} is input for the selector control circuit 404. As previously described, the selector control circuit 404 calculates multiplexer control signals mxx_sel_left based on the relative offset vector and the bit map, cf. FIG. 5.

Then, the multiplexer control blocks cxx/c'xx successively update the multiplexer selection settings, thus configuring the proper paths through the selector data path circuit 406.

In general, a stride of $2^I$ columns can be performed in multiplexer layer I. So, all data elements with an odd relative offset, i.e. for which LSB=1, must make a stride of one (1) column in the first layer.

If the relative offset is three (3) for a data element, then a stride of one (1) is made in layer 0, and it is followed by a stride of two (2) in layer 1, which will give a combined stride of three (3), i.e. the relative offset.

Thus, the binary representation of the relative offset is basically taken and for each layer the corresponding bit determines whether to make a stride or not.

For example, assume the input vector is {A,B,C,D} in FIG. 5. Then the multiplexer control block c01 receives as left input signal the control signal of data element 0, with bitmap value 1 and relative offset 2. The data element 0 has the value "A". Further, the multiplexer control block c01 receives as right input signal the control signal of data element 1 with bitmap value 1 and relative offset 2. The data element 1 has value "B".

In the first control block layer to which block c01 belongs, data elements may make a stride of one (1) column, so all data elements with an odd relative offset will move one position to the right in the first layer. The left input of multiplexer control block c01 has an even relative offset (2), i.e. the Least Significant Bit (LSB) is equal to 0, and therefore the data element in the left input signal is not supposed to make a stride of one in this first layer and the output multiplexer control signal mxx_sel_left for m01 is set accordingly to 0 to select the right input. The mxx_sel_left signals of all cxx blocks in this layer are mxx_sel_left v={X,0,0,0,X}, wherein X is indicates a fork node in the selector data path circuit 406, and wherein in the 0 indicates to the respective multiplexers of the selector data path circuit 406 that the corresponding left input data element should not be selected to make a stride in this layer, as illustrated in FIG. 5. The multiplexer control signal is transmitted to the corresponding multiplexer layer in the selector data path circuit 406.

The output bitmap bit map out is based on the relative offset and on the input bit map of the selected data element. For c01 selected to make a stride in this layer, and 1 indicates to the respective multiplexers of the selector data path circuit 406 that the corresponding data element should be selected to make a stride in this layer.

In the last multiplexer control block layer c'20-c'23, the control block c'22 gets as left input signal a control signal with a bit map value set to 0 (so the data element should not make a stride) and as right input signal a control signal with bit map value set to 1, which corresponds to input data element 0 with value "A". The right input signal has to be propagated by multiplexer m22 in the selector data path circuit 406. In the last control block layer the control signal mxx_sel_left v={1, 0,0,X} will be generated and transmitted to the corresponding multiplexer layer in the selector data path circuit 406.

In FIG. 5, the zeros (0) above the c00, c04, c10, c11, c15, c16, and c'23 control blocks, means that all fields of the respective input, and especially the selection bit map value, are set to zero. Thus, the respective input will not really be selected. Therefore, these control blocks may be used for the fork nodes.

The input vector vA={A,B,C,D} is received in the selector data path circuit 406. The input vector vA may be received from the input register 411. Further, the input vector, vA, is propagated through layers of multiplexer by the selector data path circuit 406 according to the multiplexer settings defined by the generated multiplexer control signals. For example, data element 2 with value "B" will travel from multiplexer m01 via m13 to m23.

Table 1 summarizes per combined control block and multiplexer/fork node, output values that are propagated/calculated.

TABLE 1

| | Notation: {offset, bit map, mxx_sel_left}| data element | | | | | |
|---|---|---|---|---|---|---|---|
| | 0 | 1 | 2 | 3 | 4 | 5 | 6 |
| In | {2, 1, X}|A | {2, 1, X}|B | {2, 0, X}|C | {1, 1, X}|D | | | |
| c0x/m0x | {1, 1, X}|A | {1, 1, 0}|B | {1, 0, 0}|C | {0, 0, 0}|D | {0, 1, X}|D | | |
| c1x/m1x | {0, 0, X}|A | {0, 0, X}|B | {0, 1, 1}|A | {0, 1, 1}|B | {0, 1, 0}|D | {0, 0, X}|D | {0, 0, X}|D |
| c2x/m2x | {X, 1, 1}|D | {X, 0, 0}|D | {X, 1, 0}|A | {X, 1, X}|B | | | | the relative offset of the selected right input signal is even, therefore as intended will not make a stride in this layer but should be propagated by corresponding multiplexer m01 and the input bit map value of the data element of the right input signal being 1. As both conditions are met, the output bit map of c01 should be 1.

Then the relative offset output signal, to be used in the next control block layer is calculated from the input relative offset of the data element of the selected right input, i.e. 2, through dividing this integer offset value by two and dropping the least significant bit. So for the corresponding blocks in the second multiplexer control block layer, i.e. c11 and c13, the relative offset input value is 1. In the second multiplexer control block layer the corresponding data element 2, with value "B", can do the required stride of two columns, where control block c13 will update and propagate its control compound signal and multiplexer m13 will propagate value "B". In the second control block layer the control signal mxx_sel_left v={X,X,1,0,X} will be generated and transmitted to the corresponding multiplexer layer in the selector data path circuit 406. As previously mentioned, X indicates a fork node in the selector data path circuit 406, 0 indicates to the respective multiplexers of the selector data path circuit 406 that the corresponding left input data element should not be Some general advantages of embodiments herein will now be given.

Firstly, the element selection unit 200 of some embodiments herein has a high throughput, i.e. a high number of input samples that may be processed per second. The high throughput is thanks to the capability of the element selection unit 200 to select data elements from input vectors vA comprising P data elements. This is in contrast to a scalar system which has to load words, i.e. data elements, one by one in order to perform data element selection.

Secondly, the element selection unit 200 of some embodiments herein supports a streaming mode since input vectors vA are only loaded once and only used once for a selection operation.

Thirdly, the element selection unit 200 of some embodiments herein has lower area and power consumption than for example selection systems based on a full shuffle-circuit.

Fourthly, the element selection unit 200 of some embodiments herein has low configuration overhead, since the element selection unit 200 only requires the preparation of a Boolean bit map vector, which may be performed efficiently through bitwise operations. The Boolean bit map vector may be a short Boolean bit map vector or a long Boolean bit map vector. By short Boolean bit map vector is meant a vector of exactly P Booleans. Consequently, by a long Boolean bit map vector is meant a vector of n*P Booleans, equal to the length of the long input data array that is processed.

Fifthly, the element selection unit 200 of some embodiments herein has a low cost for storing a selection bit map. The cost is one bit per input word. This is less than a shuffle based system that would store the possible set of shuffle patterns, e.g. 8 bit integer per selected word. Further, in the element selection unit 200 of some embodiments herein there is no need to store use-case specific tables of shuffle patterns which can become large.

Some embodiments will now be described in more detail with reference to embodiments of first, second, third, and fourth types.

Embodiments of a First Type: Dedicated Unit

In some embodiments of a first type, the element selection unit 200 is a dedicated unit. Sometimes the element selection unit 200 is embedded in e.g. a vector processor comprising a load and/or store architecture.

In such embodiments, element selection is a stand-alone operation. The element selection unit 200 receives an instruction to do selection of data elements from an input vector vA. The selection pattern is configured by a bit map, e.g. a short bit map, such as a vector of P Booleans, to give the selected and concatenated vector elements a certain common rotation offset. Optionally, the element selection unit 200 outputs an updated offset value based on the number of selected words from the input vector vA and the input offset value.

The selection instruction may have the following notation: vselect_elements output_vector_register, input_vector_register, bit_map_register, rotation_offset_register Actions performed according to embodiments of the first type may comprise one or more of the following:

- The element selection unit 200 receives the selection instruction, e.g. the vselect_elements instruction mentioned above. The element selection unit 200 may receive the instruction from a processor's Instruction Fetch Unit (IFU). This relates to action 301 above.
- The selector control unit 402, cf. FIG. 4, reads the bit map from the bit map register 409 indicated by bit_map_register. This relates to action 302 above.
- The selector control unit 402 reads the input rotation offset value from the input offset register 403 indicated by rotation_offset_register. This relates to action 302 above.
- The selector data path circuit 406 reads the input vector vA from the input vector register 411 indicated by input_vector_register. This relates to action 304 above.
- The selector control circuit 404 generates multiplexer control signals according to the bit map and the relative offset. This relates to action 302 above.
- The selector data path circuit 406 propagates the selected input data elements towards an output vector register 413 in accordance with the generated multiplexer control signals, concatenates the selected input data elements and gives the selected set the required rotation. This relates to action 304 above.
- The selector data path circuit 406 writes in the enabled data elements of the output vector register 413. This relates to actions 303 and 305 above.
- Optionally, the selector control unit 402 updates the output offset value and writes this value to the rotation offset register 403 indicated by rotation_offset_register.

In addition to the general advantages mentioned above, some embodiments of the first type have the advantage that the system may easily be integrated in a vector processor 206 with a load/store architecture, i.e. in a vector processor with a vector register file.

Further, since the load operation and/or the store operation are not included in the selection operation, the programmer may operate on vectors in the register file. Such a system is especially interesting for more complex operations, e.g. for sequential selection operations, or for reuse of input vectors. Another example is multi-stream selection, which means selection from the same input data with different selection bit maps. A use case would be to split the even and odd samples of the input stream into two output streams, the first with the even elements, and the second with the odd elements. The input data only has to be loaded once from memory.

Embodiments of a Second Type: Part of Load/Store Operation in a Load and/or Store Unit 202 with a Short Bit Map In some embodiments of a second type, the element selection unit 200 is comprised in a load and/or store unit 202 with a short bit map, cf. for example FIG. 2a. By a short bit map is meant a bit map comprising exactly P Booleans.

In some embodiments, the element selection unit 200 is embedded in the load and/or store unit 202, which load and/or store unit 202 may be a part of a vector processor 206.

The load and/or store unit 202 receives an instruction to load and/or store a single vector and perform selection of data elements, concatenate them and give the resulting selected elements a certain common offset. The selection bit map may be explicitly provided per load operation and/or store operation. An operation to load and select data elements, e.g. a vload_and_select_elements operation, uses a vector load unit 410, cf. FIG. 4. The vector load unit 410 may correspond to the load and/or store unit 202 illustrated in FIGS. 2a and 2b. Thus, the vector load unit 410 may comprise the element selection unit 200. However, in some embodiments, the vector load unit 410 is connected to the element selection unit 200. The vector load unit 410 is configured to load a full input vector vA from a vector memory based on an address. From the input vector vA, data elements are selected by the element selection unit 200 and are given a certain offset in the output vector, which offset is determined by an offset register. In some embodiments, the concatenating of selected data elements from each of the partially filled selector output vectors has to be done explicitly by the programmer. This is different from some embodiments wherein exactly P data elements are fetched. In such embodiments, the aggregation and concatenation of the P data elements is transparent to the programmer.

An operation to store and select data elements, e.g. a vstore_and_select_elements operation, uses a vector store unit 412. The vector store unit 412 may correspond to the load and/or store unit 202 illustrated in FIGS. 2a and 2b. Thus, the vector store unit 412 may comprise the element selection unit 200. However, in some embodiments, the vector store unit 412 is connected to the element selection unit 200. A full input vector vA is received from a vector register file. From the input vector vA, data elements are selected by the element selection unit 200. A partly filled output vector vD is processed as an unaligned vector store by the vector store unit 412. By the expression "unaligned vector store by the vector store unit 412" is meant a vector store operation in the vector memory, for which the write address is not required to be located at a multiple of the vector length. Then up to two vector memory lines are (partially) updated for one unaligned vector store operation. A write buffering scheme may be applied to merge the data of multiple unaligned stores to be able to do aligned vector store operations on the vector memory. The vector store unit 412 may comprise buffers and write support, to perform aligned vector store operations. Optionally, the vector store unit 412 updates an address pointer, e.g. an unaligned address pointer, based on the number of selected words in the input vector vA and the store address. The address pointer may be used as a write address for the following element selection and store instruction.

The load and select instruction may have the following notation: vload_and_select_elements output_vector_register, load_address_register, bit_map_register, rotation_offset_register Actions performed according to embodiments of the second type comprising load and select may comprise one or more of the following:

The load and/or store unit 202 receives the instruction to load and select data elements, e.g. the vload_and_select_elements instruction mentioned above. The load and/or store unit 202 may receive the instruction from the processor's Instruction Fetch Unit (IFU). This relates to action 301 above.

The selector control unit 402 reads the bit map from a bit map register 409 indicated by bit_map_register. This relates to action 302 above.

The selector control unit 402 reads the input rotation offset value from a offset register 403 indicated by rotation_offset_register. This relates to action 302 above.

A vector load unit 410 loads the input vector vA from a memory (not shown) from the address indicated by load_address_register and stores the loaded input vector vA in an input vector register 411. The vector load unit 410 may correspond to the load and/or store unit 202 illustrated in FIGS. 2a and 2b. Thus, the vector load unit 410 may comprise the element selection unit 200. However, in some embodiments, the vector load unit 410 is connected to the element selection unit 200. The input vector register 411 may be an internal register. This relates to action 304 above.

The selector control circuit 404 generates multiplexer control signals according to the bit map and relative offset. This relates to action 302 above.

The selector data path circuit 406 propagates the selected input data elements towards an output vector register 413 based on the generated multiplexer control signals, concatenates the selected input data elements and gives the selected set the required rotation. This relates to action 304 above.

The selector data path circuit 406 writes in the enabled data elements of the output vector register 413. This relates to actions 303 and 305 above.

Optionally, the selector control unit 402 updates the rotation offset value and writes it to the offset register 403 indicated by the rotation_offset_register.

The store and select instruction may have the following notation: vstore_and_select_elements source_vector_register, store_address_register, bit_map_register Actions performed according to embodiments of the second type comprising store and select may comprise one or more of the following:

The load and/or store unit 202 receives the instruction to store and select data elements, e.g. the vstore_and_select_elements instruction mentioned above. The instruction may be received from the processor's Instruction Fetch Unit (IFU). This relates to action 301 above.

The selector control unit 402 reads the bit map value from the bit map register 409 indicated by bit_map_register. This relates to action 302 above.

The selector control unit 402 reads the store pointer value from the register indicated by store_address_register. This relates to action 302 above.

The selector data path circuit 406 reads the input vector vA indicated by source_vector_register. This relates to action 304 above.

The selector control circuit 404 generates multiplexer control signals according to the bit map and the store address pointer, which store address pointer corresponds to the relative offset. This relates to action 302 above.

The selector data path circuit 406 propagates the selected input data elements towards the output vector register 413 based on the generated multiplexer control signals, concatenates the selected input data elements and gives the selected set the required rotation. This relates to action 304 above.

The selector data path circuit 406 writes in the enabled data elements of the output vector register 413. This relates to actions 303 and 305 above.

The vector store unit 412 does unaligned store of the output vector register 413 content.

Optionally, the selector control unit 402 updates the store address and writes the value in store_address_register.

In addition to the general advantages mentioned above, some embodiments of the second type have the advantage that the combining of the element selection unit 200 in a load/store unit 202, herein also referred to as a load store unit 202, or a load and/or store unit 202, enables the sequencing of basic operations into more complex instructions, therefore there is less overhead from for example instruction decoding.

Further, it enables reuse of the selector data path circuit 406 for the traditional unaligned load/store operations, where the bitmap has P ones (1).

Furthermore, the bit map may be calculated on the go and provided through a register, e.g. from the bit map register 409. It does not have to be provided through a memory that requires load operations, and therefore it reduces overhead. This may be relevant for bitmap patterns which are periodic in a short time interval.

Yet further, selection as part of a store operation with an explicit short bitmap can be useful for helper selection functions, especially if it is doing multi-stream selection (multiple possibly calculated bit maps) from the vector data before storing it to memory. By the expression "helper selections functions" is meant functions such as software functions, which main task it is to take samples from an input stream and store a selected set back to memory. Such helper functions are instantiated, when doing input selection in the consumer signal processing function(s) would be complex or inefficient.

Embodiments of a Third Type: Part of Load and/or Store Operation in a Load Store Unit with Long Bitmap In some embodiments of a third type, the element selection unit 200 is comprised in a load and/or store unit 202 with long bit map, cf. e.g. FIG. 2a. In some embodiments, the element selection unit 200 is embedded in a load and/or store unit 202 that is a part of a vector processor 206. By a long bit map is meant a vector of n*P Booleans, equal to the length of the long input data array that is processed.

The load and/or store unit 202 receives an instruction to load a full input vector vA of P selected vector elements or store a full input vector vA of P selected vector elements. The selection bit map bit_map is implicitly obtained by a bit map load unit 408. The bit map load unit 408 is configured to function like a cache or buffering system of the long bit map vector. Further, the bit map load unit 408 is comprised in or connected to the element selection unit 200. The selection bit map bit_map may be implicitly obtained in the background.

The vector of P Booleans, corresponding to the P input data elements that are processed at a certain iteration, are loaded from memory, when this set is not found in the buffer/cache. The buffer may be larger than P Booleans, say c*P, where c may be 2, 4, 8 etc.

An operation to load P selected data elements e.g. according to a vload_and_select_elements_using_long_bitmap instruction, uses a vector load unit 410. The vector load unit 410 is comprised in or connected to the element selection unit 200. The vector load unit 410 loads input vectors vA one-by-one from a vector memory (not shown) based on a pointer to a long input array. The bit map load unit 408 loads, and optionally buffers, a part of a long selection bit map array, based on a pointer to the long selection bit map array. The selector data path circuit 406 selects from each loaded input vector vA the data elements indicated by the corresponding part of the long bit map and appends the selected data elements to the output vector vD by giving the selected and concatenated data elements a rotation offset. The process of loading input vectors vA, selecting data elements from these input vectors vA and appending them to the output vector vD continues until a single output vector has been completely filled. In some embodiments, the processor gets stalled in the meantime.

An operation to store selected data elements, e.g. according to a vstore_and_select_elements_using_long_bitmap instruction, uses a vector store unit 412. The vector store unit 412 may correspond to the load and/or store unit 202 illustrated in FIGS. 2a and 2b. Thus, the vector store unit 412 may comprise the element selection unit 200. However, in some embodiments, the vector store unit 412 is connected to the element selection unit 200. A full input vector vA is received from a vector register file. From the input vector vA, data elements are selected by the selector data path unit 406. The bit map for selection is loaded by a bit map load unit 408, based on e.g. a pointer to the bit map array. The bit map load unit 408 is comprised in or connected to the element selection unit 200, and the pointer to the bit map array is received in the instruction. The partly filled output vector vD is processed as an unaligned vector store by the vector store unit 412. The vector store unit 412 may comprise buffers and write support, to do aligned vector store operations. It updates the unaligned address pointer based on the number of selected words in the input vector vA and the input address pointer.

Note that the operation to store selected data elements following the vstore_and_select_elements_using_long_bitmap instruction behaves much like the operation to store selected elements following the vstore_and_select_elements instruction of embodiments of the second type described above. One difference is that the bit map is not provided with the store operation, but it is implicitly loaded.

The load and select instruction may have the following notation: vload_and_select_elements_using_long_bitmap output_vector_register, load_address_register, bit_map_address_register Actions performed according to embodiments of the third type comprising load and select may comprise one or more of the following:

The load and/or store unit 202 receives the instruction to load P selected data elements, e.g. the vload_and_select_ elements_using_long_bitmap instruction mentioned above. The instruction may be received from the processor's Instruction Fetch Unit (IFU). This relates to action 301 above.

The bit map load unit 408 loads the bit map from a memory based on the address in the bit map register 409 indicated by bit_map_address_register. This relates to action 302 above.

The selector control unit 402 reads an input offset value from the offset register 403 indicated by the rotation_offset_register. The offset register 403 may be an internal register. This relates to action 302 above.

The vector load unit 410 loads an input vector vA from a memory (not shown) and stores it in the input vector register 411. This relates to action 304 above.

The selector control circuit 404 generates multiplexer control signals according to the bit map and the relative offset. This relates to action 302 above.

The selector data path circuit 406 propagates the selected input data elements towards an output vector register 413 based on the generated multiplexer control signals, concatenates the selected input data elements, and gives the selected set the required rotation. This relates to action 304 above.

The selector data path circuit 406 writes in the enabled elements of the output vector register 413. This relates to actions 303 and 305 above.

The selector control unit 402 updates and writes the load address and the bit map address and writes these values to the specified registers.

if the output vector register(s) 413 does not comprise a full output vector vD, the process may repeat the actions mentioned above from the second action, else it continues to next action.

The output vector register 413 is written to a vector register file of the processor.

The store and select instruction may have the following notation: vstore_and_select_elements_using_long_bitmap input_vector_register, store_address_register, bit_map_address_register Actions performed according to embodiments of the third type comprising store and select may comprise one or more of the following:

The load and/or store unit 202 receives an instruction to store selected data elements, e.g. the vstore_and_select_elements_using_long_bitmap instruction mentioned above. The instruction may be received from the Instruction Fetch Unit (IFU). This relates to action 301 above.

The bit map load unit 408 loads the bit map from a memory (not shown) based on the address in the bit map register 409 indicated by bit_map_address_register. This relates to action 302 above.

The selector control unit 402 reads the store pointer value from a register (not shown) indicated by store_address_register. This relates to action 302 above.

The selector data path circuit 406 reads the input vector vA from the input vector register 411 indicated by input_vector_register. This relates to action 304 above.

The selector control circuit 404 generates multiplexer control signals according to the bit map and the store address pointer. The store address pointer corresponds to the relative offset. This relates to action 302 above.

The selector data path circuit 406 propagates the selected input data elements towards the output vector register 413 based on the generated multiplexer control signals, concatenates the selected input data elements, and gives the selected set the required rotation. This relates to action 304 above.

The selector data path circuit 406 writes in enabled data elements of the output vector register 413. This relates to actions 303 and 305 above.

The selector control unit 402 updates and writes the store address pointer and the bit map address pointer and writes these values to the store register and the bit map register 409, respectively.

The vector store unit 412 does an unaligned store of the partially filled output vector register 413. Optionally, the vector store unit 412 delays the store operation until P selected data elements have been aggregated.

In addition to the general advantages mentioned above, some embodiments of the third type have the advantage that the combining of the element selection unit 200 in a load/store unit 202 enables the grouping of operations, therefore there is less overhead from e.g. instruction decoding.

Further, some embodiments of the third type enable reuse of the selector data path circuit 406 for the traditional unaligned load/store operations, where the bitmap has P ones (1).

Furthermore, the use of the load and select operation is very convenient if the input data has to be used directly by complex vector computations. For the programmer the load with select operation always results in a full vector, regardless of how many input vectors have to be loaded to aggregate the data. There is no need to do in software the combining of vectors that are partially filled with selected elements.

Embodiments of a Fourth Type: Part of Memory-To-Memory Transfer System

Figure 2A:
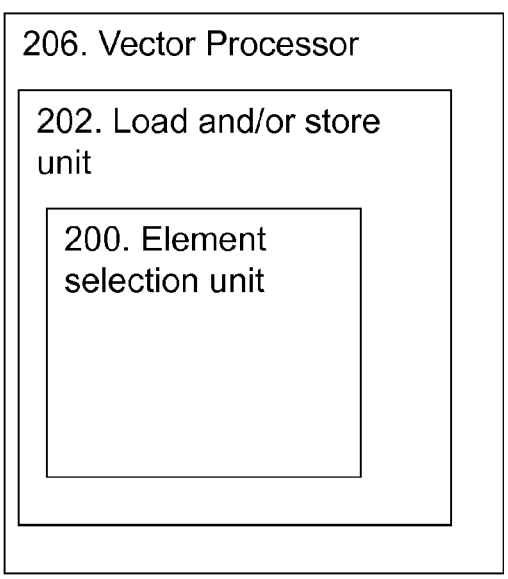
FIGS. 2a-2d schematically illustrate embodiments of en element selection unit, a load and/or store unit, a memory-to-memory transfer system, a vector processor, an integrated circuit, and a communication device.
Figure 2B:
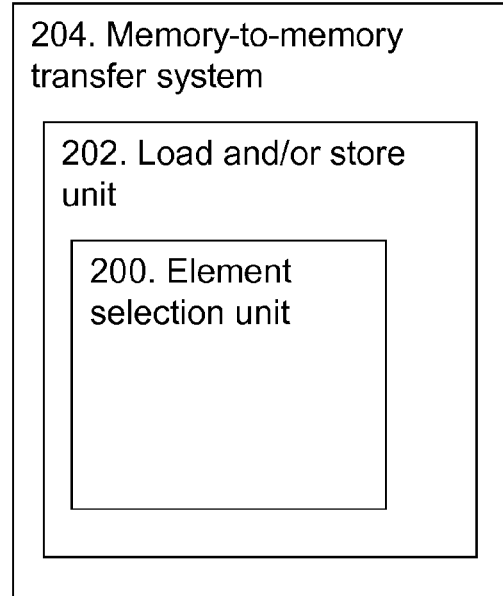
Figure 2C:
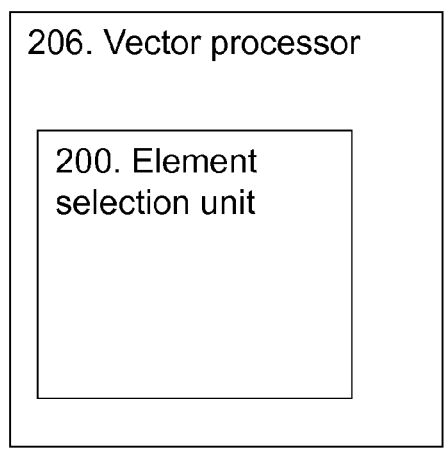
Figure 2D:
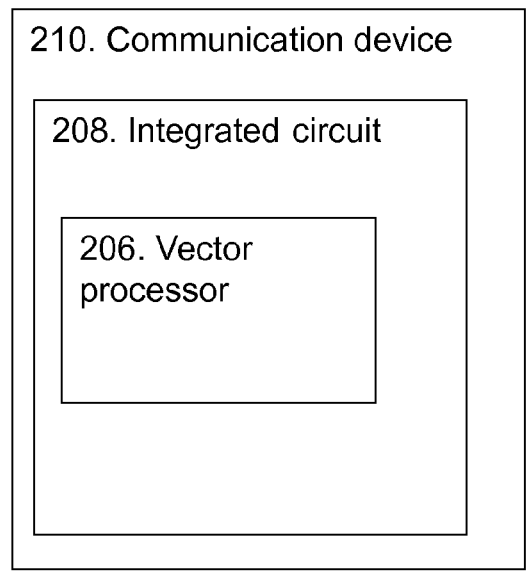

In some embodiments of a fourth type, the element selection unit 200 is embedded in a memory-to-memory transfer system 204, cf. e.g. FIG. 2b. An example of such a system is a DMA unit.

The memory-to-memory transfer system 204 receives an instruction to copy an array of data from a source address to a destination address, while selecting and concatenating the data elements indicated by a selection bit map. The selection bit map may be a long selection bit map and it may be implicitly obtained in the background by a bit map load unit 408. The bit map load unit 408 is comprised in or connected to the element selection unit 200.

The memory-to-memory transfer system 202 uses a vector load unit 410, which loads input vectors vA one-by-one from a source memory (not shown) based on a source address. The vector load unit 410 comprises the element selection unit 200 or is connected to the element selection unit 200. The bit map load unit 408 loads, and optionally buffers, a part of the selection bit map array, based on a pointer to the selection bit map array. The selector data path circuit 406 selects from each input vector vA, the data elements indicated by the appropriate portion of the long bit map and appends them to the output vector vD by giving the selected and concatenated data elements a rotation offset. The process of loading input vectors vA, selecting data elements from these input vectors vA and appending them to the output vector vD may continue until a single output vector vD has been completely filled. Then, a vector store unit 412 does an aligned store operation to the destination address. As previously mentioned the vector store unit 412 comprises the element selection unit 200 or is connected to the element selection unit 200.

The instruction to copy selected data elements may have the following notation: copy_selected_elements destination_address, source_address, bit_map_address, block_size Actions performed according to embodiments of the fourth type comprising copying of selected data elements may comprise one or more of the following:

The memory-to-memory transfer system 204 receives an instruction to copy selected data elements, e.g. the copy_selected_elements instruction mentioned above. The instruction may be received from a processor. The instruction and its configuration may be received in various ways, e.g. via a direct control interface, via a memory mapped configuration, and/or via a register mapped configuration. This relates to action 301 above.

A bit map load unit 408 loads from a memory (not shown), and possibly buffers, a part of the long bit map array based on the address indicated by bit_map_address. The bit map load unit 408 is comprised in or connected to the element selection unit 200. This relates to action 302 above.

The selector control unit 402 reads the offset value from a rotation offset register 403. The rotational offset register 403 may be an internal register. This relates to action 302 above.

A vector load unit 410 loads an input vector vA from a memory (not shown) indicated by the source_address and stores it in the input vector register 411. The vector load unit 410 may correspond to the load and/or store unit 202 illustrated in FIGS. 2a and 2b. Thus, the vector load unit 410 may comprise the element selection unit 200. However, in some embodiments, the vector load unit 410 is connected to the element selection unit 200. This relates to action 304 above.

The selector control circuit 404 generates multiplexer control signals according to the bit map and the relative offset. This relates to action 302 above.

The selector data path circuit 406 propagates the selected input data elements towards an output vector register 413 based on the generated multiplexer control signals, concatenates the selected input data elements, and gives the selected set the required rotation. This relates to action 304 above.

The selector data path circuit 406 writes in the enabled data elements of the output vector register 413. This relates to actions 303 and 305 above.

The selector control unit 402 updates and writes the source address pointer and the bit map address pointer and writes these values to the indicated registers.

If the output vector register(s) 413 does not have a full output vector vD to output, the process repeats the actions mentioned above from the action of loading, and possibly buffering, the part of the long bit map array. If the output vector register(s) 413 does have a full output vector vD to out, the following actions are performed.

The output vector register 413 is written to the destination address by the vector store unit 412.

The destination address pointer is updated by the selector control unit 402.

If the block has been completely copied, derived from the block size configuration parameter, then the memory-to-memory transfer system 204 finishes, possibly signalling its completion to another system, such as to a control processor (not shown). If the block has not been completely copied, the process repeats the actions mentioned above from the action of loading, and possibly buffering, the part of the long bit map array.

In addition to the general advantages mentioned above, some embodiments of the fourth type have the advantage that the bit map based configuration of a memory-to-memory transfer system 204, e.g. a DMA unit, for copying selected data elements in a block has very low overhead. The overhead is low both in terms of memory area required for configuration, and in terms of the time that is wasted in order to control the configuration.

Extensions

Some embodiments described herein may comprise one or more of the following extensions.

Extension 1: Configurable Word Size

The bit map, bit_map, is a vector of Booleans, indicating for each word, i.e. each data element, in the input vector vA whether or not the word, i.e. the data element, must be selected. The selector data path circuit 406 is designed for a certain number of physical words per input vector vA, i.e. P words, with a word size of W bits. In some embodiments, it is possible to extend the selector control unit 402 to support logical words of bigger size, by grouping sequential physical words. For example, logical words of physical word size W'=2W, W"=4W etc. can be constructed. The bit map configures the selection of logical words of a certain size, not of physical words of a size determined by the selector circuit. Thus, the cost of loading bit maps (i.e. the cost in performance and energy related to consumption of processor cycles and memory bandwidth) and the storage required for the bit map may be reduced for larger word sizes.

Extension 2: Fixed Point Format Compression and Fixed Point Format Decompression There is a case for combining selection and compressing, or combining selection and decompressing, of the fixed point format of the words. An important case for LTE is the conversion of a 32 bit word (actually complex format 16+16 bits) to a 24 bits word (12+12 bit), and vice versa. The required system would have an 8 bit word-selector circuit and decompressing/compressing multiplexer circuits before/after it (not shown in FIG. 4). Selection of 32 bit input words, which get compressed to 24 bits, simply means that every 4rd byte of the input to the selector data path circuit 406 (i.e. output from the compressor circuit) is discarded.

Extension 3: Bit Map Pre-Fetch with Interpretation

The bit map load unit 408 may be configured to pre-fetch and interpret portions of a long bit map and skip portions of the long bit map ahead, if there are P subsequent zeros belonging to an input vector vA. Then there is no need to load the input vector vA.

This extension may be relevant for some of the embodiments of the third and fourth types described above.

Extension 4: Periodic Bit Map Configuration

For periodic bit maps, which are common for e.g. LTE resource element extraction, possibly combined with a certain resource block level mask, spelling out the entire bit map may give some unnecessary overhead. The bit map load unit 408 may be configured with a base bit map pattern (e.g. 12 Booleans for a basic LTE resource block pattern), information on the number of repetitions (e.g. length of 100 basic blocks) and possibly a block level mask (e.g. 100 Booleans to conditionally select/discard all 12 elements of a basic block). The bit map load unit 408 may be configured to generate for the selector control unit 402 a Boolean vector of the P words of the loaded input vector vA.

This extension may be relevant for some of the embodiments of the third and fourth types described above.

As previously mentioned, embodiments herein do also relate to a load and/or store unit 202 comprising the element selection unit 200 described above, to a memory-to-memory transfer system 204 comprising the element selection unit 200 described above, to a vector processor 206 comprising the element selection unit 200 described above, to an integrated circuit 208 comprising the vector processor 206 and to a communication device 210 comprising the integrated circuit 208.

The communication device 210 may be a mobile terminal or a wireless terminal, a mobile phone, a computer such as e.g. a laptop, a tablet pc such as e.g. an iPad™, a Personal Digital Assistant (PDA), or any other radio network unit capable to communicate over a radio link in a cellular communications network.

Further, embodiments herein do also relate to a computer program product with program code portions for carrying out one or more of the actions and/or realizing one or more of the features described herein, when executed in a processing unit.

Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of "consist at least of".

When using the word "action/actions" it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described examples. Various alternatives, modifications and equivalents may be used. Therefore, the above examples should not be taken as limiting the scope of the invention, which is defined by the appending claims.

The invention claimed is:

1. A method in an element selection unit for vector element selection, the element selection unit comprises a selector control circuit and a selector data path circuit, which selector data path circuit comprises a plurality of layers that each comprises a plurality of multiplexers, and wherein the method comprises:

receiving an instruction to perform a selection of data elements from a source vector comprising at least one input vector, which instruction comprises information relating to the at least one input vector, information relating to at least one output vector, and information relating to a bit map;

by means of the selector control circuit, generating a multiplexer control signal for each multiplexer of the plurality of multiplexers based on the bit map and on a plurality of relative offset values, each of which plurality of relative offset values is calculated for each of the data elements of the input vector based on an input offset value and based on the bit map;

by means of the selector data path circuit, propagating the data elements comprised in the input vector through the plurality of layers of multiplexers towards the output vector based on the generated multiplexer control signals; and by means of the selector data path circuit, writing the propagated data elements to data elements of the output vector, wherein the bit map defines which data elements are selected by the selector data path circuit from the input vector and written to the output vector and which data elements are not selected by the selector data path circuit and not written to the output vector.

2. The method of claim 1, wherein each relative offset value, _rel_offset(i), is calculated as:

$$\text{rel\_offset}(i) = \Sigma_{j=0}^{i-1} \text{bit\_map}(j) + (\text{input\_offset} - i),$$

wherein i is the number of elements in the input vector, bit_map(j) is the bit map value for element j of the bit map, and input_offset is the input offset value, wherein i and j are positive integers.

3. The method of claim 1, wherein the propagating of the data elements further comprises:
by means of the selector data path circuit, configuring data paths through the plurality of layers of multiplexers based on the generated multiplexer control signals.

4. The method of claim 1, further comprising:
by means of the selector control circuit, generating write enabling signals for data elements of the output vector based on the bit map, each of which write enabling signal enables writing to one of the data elements of the output vector.

5. The method of claim 1, wherein each of the plurality of relative offset values is calculated using the input offset value and values from unique positions in the bit map.

6. The method of claim 5, wherein different multiplexers in a single layer of the plurality of layers of multiplexers have different relative offsets.

7. An element selection unit for vector element selection, the element selection unit comprises a selector control circuit and a selector data path circuit, which selector data path circuit comprises a plurality of layers that each comprises a plurality of multiplexers, and wherein the element selection unit further comprises:
a receiving circuit configured to receive an instruction to perform a selection of data elements from a source vector comprising at least one input vector, which comprises information relating to the at least one input vector, information relating to at least one output vector, and information relating to a bit map;
wherein the selector control circuit is configured to generate a multiplexer control signal for each multiplexer of the plurality of multiplexers based on the bit map and on a plurality of relative offset values, each of which plurality of relative offset values is calculated for each of the data elements of the input vector based on an input offset value and based on the bit map;
wherein the selector data path circuit is configured to propagate the data elements comprised in the input vector through the plurality of layers of multiplexers towards the output vector based on the generated multiplexer control signals; and
wherein the selector data path circuit is configured to write the propagated data elements to data elements of the output vector,
wherein the bit map defines which data elements are selected by the selector data path circuit from the input vector and written to the output vector and which data elements are not selected by the selector data path circuit and not written to the output vector.

8. The element selection unit of claim 7, wherein the selector control circuit is configured to calculate each relative offset value, rel_offset(i), as:

$$\text{rel\_offset}(i) = \Sigma_{j=0}^{i-1} \text{bit\_map}(j) + (\text{input\_offset} - i),$$

wherein i is the number of elements in the input vector, bit_map(j) is the bit map value for element j of the bit map, and input_offset is the input offset value, wherein i and j are positive integers.

9. The element selection unit of claim 7, wherein the selector data path circuit further is configured to configure data paths through the plurality of layers of multiplexers based on the generated multiplexer control signals.

10. The element selection unit of claim 7, wherein the selector control circuit is further configured to generate write enabling signals for data elements of the output vector based on the bit map, each of which write enabling signal enables writing to one of the data elements of the output vector.

11. A load store unit comprising the element selection unit of claim 7.

12. A memory-to-memory transfer system comprising the load store unit of claim 11.

13. A vector processor comprising the element selection unit of claim 7.

14. An integrated circuit comprising the vector processor of claim 13.

15. A communication device comprising the integrated circuit of claim 14.

16. The element selection unit of claim 7, wherein each of the plurality of relative offset values is calculated using the input offset value and values from unique positions in the bit map.

17. The element selection unit of claim 16, wherein different multiplexers in a single layer of the plurality of layers of multiplexers have different relative offsets.

* * * * *